United States Patent [19]

Beauvir

[11] Patent Number: 4,941,504
[45] Date of Patent: Jul. 17, 1990

[54] MANUAL FLUID-CONTROL VALVE WITH LIMITED CLOSING PRESSURE

[76] Inventor: Jacques Beauvir, Grand Rue 34 A, CH-2036 Cormondreche, Switzerland

[21] Appl. No.: 371,929

[22] Filed: Jun. 27, 1989

[51] Int. Cl.$^5$ ............................................. F16K 17/06
[52] U.S. Cl. .................................... 137/524; 137/556.3; 251/83; 251/297; 251/335.3
[58] Field of Search ..................... 137/524, 556, 556.3; 251/82, 83, 297, 278, 335.3, 357

[56] References Cited

U.S. PATENT DOCUMENTS

| | | | |
|---|---|---|---|
| 1,146,723 | 7/1915 | Losh | 251/83 |
| 1,541,757 | 6/1925 | Allen | 251/83 |
| 1,641,892 | 9/1927 | Lane | 251/83 |
| 3,420,493 | 1/1969 | Kraft | 251/82 |
| 3,589,671 | 6/1971 | Strache | 251/83 |
| 3,982,561 | 9/1976 | Harthun | 251/83 X |
| 4,364,541 | 12/1982 | Chabat-Courrède et al. | 251/83 X |

Primary Examiner—John Rivell
Attorney, Agent, or Firm—Herbert Dubno; Andrew M. Wilford

[57] ABSTRACT

A manual fluid-control valve has a housing defining a chamber formed with a seat and with a fluid inlet and a fluid outlet opening into the chamber at opposite sides of the seat and a valve body in the housing having an end face and displaceable axially forward into a closed position with the end face engaging the seat and blocking fluid flow through the chamber between the inlet and outlet and an open position with the end face spaced-axially backward from the seat and permitting fluid flow through the chamber between the inlet and outlet. An operating element is axially displaceable in the housing adjacent the valve body but out of direct contact with the valve body and a spring is braced between the operating element and the valve body and constitutes the only axial-force- transmitting link between the body and the element. An operating mechanism is connected to the operating element for axially displacing same and thereby also displacing the valve body between its positions via the spring.

13 Claims, 1 Drawing Sheet

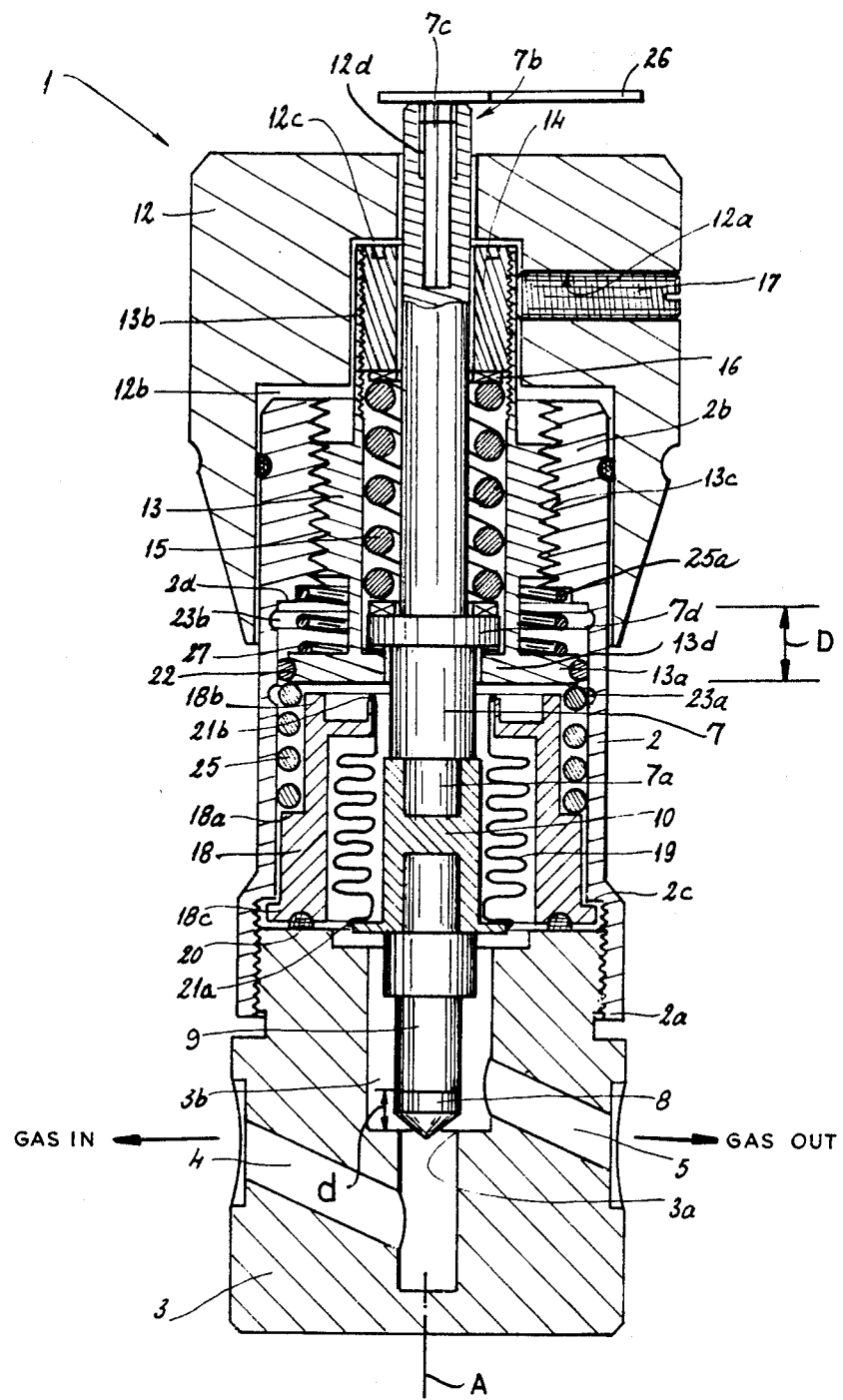

MANUAL FLUID-CONTROL VALVE WITH LIMITED CLOSING PRESSURE

Field of the Invention

The present invention relates to a manual control valve. More particularly this invention concerns such a valve used to control the flow of a highly toxic fluid.

Background of the Invention

A standard flow-control valve has a valve housing defining a chamber formed with a seat and with a fluid inlet and a fluid outlet that open into the chamber at opposite sides of the seat. A valve body has an end face and is displaceable longitudinally forward in the housing into a closed position with the end face engaging the seat and blocking fluid flow through the chamber between the inlet and outlet and an open position with the end face spaced longitudinally backward from the seat and permitting fluid flow through the chamber between the inlet and outlet. A mechanical operating system is provided for displacing the valve body longitudinally forward and back, typically for instance the valve body is threaded into the housing and is provided with a knob or handle so that when it is rotated it moves longitudinally.

The disadvantage of such a system is that the force with which the valve body bears on the seat is dependent on the force with which the actuating mechanism is closed. Thus when it is forcibly closed, the body bears with great force on the seat, and when not so forcibly closed it engages the seat with correspondingly less force.

Such an arrangement therefore can have either of two main problems. First of all it is likely that after repeated closings the end face of the valve body and/or the seat will become deformed from the pressure with which they bear on each other, so that leakage can occur or at the very least it becomes necessary with each closing to exert more force than the previous time. It is also possible that a negligent operator can insufficiently tighten the valve when closing it, particularly when the valve is old and the seat is damaged, so that it is not perfectly closed. Both these problems are particularly significant when the valve is being used to control the flow of a highly toxic gas such as is used in the manufacture of fiber-optical cables and semiconductors. In these cases any leakage can have disastrous if not fatal consequences.

Another difficulty with the known such valves is that it is difficult to ascertain exactly whether the valve is fully opened or closed. When as is common a control knob connected to the valve body forms the top of the valve and fits down over the valve housing, the indicator will be a mark or pointer on the downwardly directed rim of the knob and an annular array of indicia on the valve housing therebelow. Such an indicator is typically obscured when the valve is being gripped and operated, and at best is difficult to read. In addition the relative positions of the pointer and indicia change significantly as the valve wears as described above.

Objects of the Invention

It is therefore an object of the present invention to provide an improved manual flow control valve.

Another object is the provision of such an improved manual flow control valve which overcomes the above-given disadvantages, that is which, even though operated by hand, will always close surely and accurately, with the valve body bearing on the seat with a pressure that is neither more nor less than a predetermined ideal level.

A further object is to provide such a valve with easy-to-read indicia that always return to the same spot in the fully open and fully closed positions of the valve.

Summary of the Invention

A manual fluid-control valve according to this invention has a housing defining a chamber formed with a seat and with a fluid inlet and a fluid outlet opening into the chamber at opposite sides of the seat and a valve body in the housing having an end face and displaceable longitudinally forward into a closed position with the end face engaging the seat and blocking fluid flow through the chamber between the inlet and outlet and an open position with the end face spaced longitudinally backward from the seat and permitting fluid flow through the chamber between the inlet and outlet. An operating element is longitudinally displaceable in the housing adjacent the valve body but out of direct contact with the valve body and a spring is braced between the operating element and the valve body and constitutes the only longitudinal-force-transmitting link between the body and the element. An operating mechanism is connected to the operating element for longitudinally displacing same and thereby also displacing the valve body between its positions via the spring.

Thus with this system the force with which the valve body bears on the valve seat is determined by the spring. When a spring is provided that is under some precompression so that its spring characteristic in the used operating range is substantially flat, this force will therefore be even virtually from the instant the body engages the seat until the operating element has moved to its forward end position. Thus even if a heavy-handed operator screws the valve all the way shut, the seat will not be damaged, and if a negligent operator just barely closes the valve, the force will be the same. Neither the seat nor the valve body will be accidentally deformed, and leakage will be substantially ruled out.

According to a feature of this invention the operating element carries an abutment having a longitudinally forwardly directed face and the valve body has a longitudinally backwardly directed face. The spring is braced between these faces. In addition the housing and element extend along and are in fact centered on a longitudinal axis and are formed with interengaging screwthreads centered thereon so that rotation of the element on the housing axially and longitudinally relatively displaces the element and housing. Furthermore the operating element is a sleeve centered on the axis inside the housing, surrounding the valve body, and having a cap forming an operating knob. The valve body has a stem projecting upward through and past the element and knob and this stem has an upper end outside the element and knob and carrying an indicator of the position of the valve body. Thus this indicator is easily seen at all times, and always returns to the same positions at the start and end of the stroke of the operating element and valve body.

In accordance with a further feature of this invention the operating element is formed with an abutment having a longitudinally rearwardly directed face and the valve body is formed with a longitudinally forwardly directed face directly confronting the face of the element. In addition the housing is formed with a pair of abutments defining extreme rear and forward end positions for the operating element that define therefor a predetermined stroke. The valve body is, however, only movable through a substantially shorter stroke on displacement of the operating element from its extreme rear to its extreme forward position, as well before the end of the forward stroke of the operating element the abutment faces of the body and element separate as the valve end face engages the seat. Furthermore the operating element is also formed with a longitudinally forwardly directed face and the housing is formed with a longitudinally rearwardly directed face and another spring is braced longitudinally between the faces and urges the element longitudinally back in the housing. This second spring therefore ensures that the element will offer the same resistance to rotation in the opening direction as in the closing direction.

The element according to this invention is movable between extreme forward and extreme back positions respectively corresponding to the closed and open positions of the valve body and as mentioned above the housing is formed with front and rear abutments engaging the element substantially only in the forward and back positions, respectively, and with inwardly open front and rear grooves adjacent the abutments. The valve element itself is provided with a peripheral seal engaging the housing and seated in the front and rear grooves in the forward and back positions, respectively. Thus the valve element is retained in these end positions to prevent accidental opening or closing of the valve, for instance from vibration.

Description of the Drawing

The above and other objects, features, and advantages will become more readily apparent from the following, reference being made to the accompanying drawing whose sole figure is an axial section through the valve according to this invention.

Specific Description

As seen in the drawing a valve 1 according to this invention is basically centered on an axis A and has a housing 2, 3 comprised of an internally stepped housing tube 2 having internally threaded lower and upper ends 2a and 2b and a lower-end fitting 3 screwed into the lower end 2a and forming a chamber 3b. A seat 3a in the chamber 3b lies between an inlet passage 4 and an outlet passage 5. A cup-shaped knob 12 having a central bore stepped at 12b and 12c covers the top of the housing 2 and a valve body 7, 9, 10 axially displaceable in the housing 2 has a conical tip 8 engageable with the seat 3a to block flow between the ports 4 and 5. The valve 1 is shown in an intermediate position between a fully open position with the valve body 9 lifted somewhat more than is illustrated and a fully closed position with the tip 8 engaging the seat 3a.

The valve body 7, 9, 10 includes a lower stepped rod 9 carrying the tip 8, an intermediate H-section coupling element 10 in which the upper end of the rod 9 is seated, and a stem 7 having a lower end 7a screwed into the coupling 10. Thus the tip 8 can be unscrewed from the coupling 10 for replacement, if necessary. The stem 7 has an upper end 7b formed with an axially backwardly open recess 7c that is of hexagonal section at its base but threaded at 12d adjacent its mouth so that a pointer 26 or other indicating element can be secured to this stem 7 to indicate the axial position of the valve stem 7 relative to the housing 2 and knob 12, the relative angular position being an absolute indication of the position of the tip 8. An allen wrench can be inserted into the hex recess 7c to rotationally immobilize the stem 7 during exchange of the tip 8. Intermediate its two ends the stem 7 is formed with a radially outwardly projecting ridge 7d having axially forwardly and backwardly directed faces centered on the axis A and extending in planes perpendicular to this axis A.

An operating sleeve 13 surrounds the stem 7 and has at its forward (downward in the drawing) end a radially outwardly projecting flange 13a and a radially inwardly projecting flange 13d. This element 13 is also formed with an internally threaded rearward extension 13b and therebelow with a multiple external screwthread 13c that meshes with a complementary internal thread of the upper end 2b of the housing tube 2. The inwardly projecting flange 13d has an annular rearwardly directed face engageable via teflon washers 27 with the front face of the entrainment ridge 7d of the stem 7. The outer edge of the flange 13a is formed with a radially outwardly open groove holding an O-ring seal 22 that radially outwardly engages the inner wall of the housing tube 2. This tube 2 in turn is formed with front and rear radially inwardly open grooves 23a and 23b into which the seal 22 engages in extreme forward and back positions of the operating sleeve 13.

Threaded inside the rear extension 13b of the operating sleeve 13 and spacedly surrounding the stem 7 is an abutment ring 14 having a forwardly directed face spaced axially from but confronting the rear face of the ridge 7d. A heavy-duty coil compression spring 15 has a rear end bearing on the front face of the ring 14 via an antifriction washer or bearing 16 and a front end similarly bearing on the rear face of the ridge 7d. Thus this spring 15 urges the stem 7 and the valve tip 8 forward relative to the operating sleeve 13 with a fairly constant force determined by the position of the abutment ring 14 in the element 13, which position can be adjusted to adjust the spring force, to which end appropriate tool recesses are provided in the back end face of the ring 14. The knob 12 is formed with a radially outwardly open hole 12a in which is mounted a set screw 17 that bears on the rear extension 13 and rotationally locks the knob 12 on the operating sleeve 13.

The housing tube 2 is also provided with an inner sleeve 18 having an axially backwardly directed annular face 18a confronting the front face of the flange 13a, with another coil compression spring 25 being braced between these two faces. The front end of this sleeve 18 is pressed down by a shoulder 2c of the tube 2 and bears via an O-ring 20 on the bottom 3 of the housing and a metallic accordion-type cuff 19 has a front end plasma welded at 21a to a flange of the coupling 10 and a rear end welded annularly at 22b to the rear end of this sleeve 18. Thus the chamber 3b is absolutely sealed regardless of the axial position of the valve rod 9.

The sleeve 13 also has a rear end 18b forming a front abutment for the flange 13a and the tube 2 is formed with a forwardly directed shoulder 2d forming a rear abutment therefor. The sleeve 13 can move through a stroke D between these two abutments 18b and 2d, this stroke D being equal to the axial distance between the abutments surfaces 2d and 18a minus the thickness of the flange 13a.

Another compression spring 25a has a rear end braced against a front face of the housing tube 2 and a front end braced against the back face of the flange 13a to maintain the entire structure under compression and tight.

The valve 1 is closed by rotating the cap 12 in a direction to screw the element 13 axially forward in the tube 2. Until the tip 8 engages the seat 3a the ridge 7d will rest on the flange 13d and the valve body will move perfectly synchronously with the operating element 13. Once, however, the tip 8 engages the seat the ridge 7d will lift off the flange 13d and the element 13 will only be bearing via the spring 15 on the stem 7. Thus the force exerted by the valve rod 9 on the seat 3a will be exclusively determined by the force of the spring 15, which will change little as it is compressed since the spring 15 is under some precompression. As a result even if the knob 12 is screwed all the way down, the tip 8 will not damage the seat 3a.

Once the element 13 moves into its extreme front position in which the valve is closed, the seal 22 will snap into the groove 23a and thereafter resist reverse movement of the element 13. It thus cannot vibrate or rattle open.

To open the valve 1, the knob is oppositely rotated to move the operating sleeve 13 upward. This reverse movement and rotation is resisted by the spring 25 with about the same force as the forward rotation is resisted by the spring 15 so that the force needed to open and close the valve 1 is substantially the same The element 13 will move backward through a stroke d substantially shorter than the stroke D until the flange 13d engages under the collar 7d and pulls the stem 7 and, with it, the rod 9 and tip 8 up off the seat 3a. The length of the stroke d is the distance the stem 7 must retract from the closed position of the valve before the back face of the flange 13d will move back until the seal 22 seats in the rear retaining groove 23b and the flange 13a engages the face 2d of the tube 2, thereby retaining the valve in this position.

The actual position of the valve stem 7 and of the tip 8 can clearly be read from outside the valve 1 by the axial position of the stem end 7b relative to the knob 12. The relative angular positions of the pointer 26 and the knob 12, which can bear indicia for the pointer 26, indicate of the knob 12 has been turned to the end. If a very steep multiple thread is used between the element 13 and the tube 2 a quarter turn can be sufficient to open or close the valve; if a shallow thread is used many turns are needed.

It is within the scope of this invention to make certain obvious mechanical changes, such as replacing the rotary screwthread actuation of the element 13 with a lever-type operating system. In addition the flat conical tip 8 can be replaced with a needle so that the valve 1 can be used for delicate flow control, in which case a very shallow thread 13c is employed. Finally it is possible to use the valve to control the flow of any fluid in addition to toxic gases, even for household use.

I claim:

1. A manual fluid-control valve comprising:
   a housing extending along a longitudinal axis and defining a chamber formed with a seat and with a fluid inlet and a fluid outlet opening into the chamber at opposite sides of the seat;
   a valve body in the housing having an end face and displaceable longitudinally forward into a closed position with the end face engaging the seat and blocking fluid flow through the chamber between the inlet and outlet and an open position with the end face spaced longitudinally backward from the seat and permitting fluid flow through the chamber between the inlet and outlet, the valve body having a longitudinally backwardly directed face;
   an operating element formed as a sleeve centered on the axis, longitudinally displaceable in the housing around the valve body, out of direct contact with the valve body, and having a longitudinally forwardly directed face, the housing and operating element being formed with interengaging screwthreads centered on the axis, whereby rotation of the element on the housing axially and longitudinally relatively displaces the element and housing, the operating element including a cap forming an operating knob;
   a stem projecting upward through and past the operating element and knob from the valve body; and
   a spring braced between the faces of the operating element and the valve body and constituting the only longitudinal-force-transmitting link between the body and the operating element.

2. The valve defined in claim 1 wherein the stem has an upper end outside the operating element and knob and carrying an indicator of the angular position of the operating element.

3. The valve defined in claim 1 wherein the operating element is formed with an abutment having a longitudinally rearwardly directed face and the valve body is formed with a longitudinally forwardly directed face directly confronting and operatively engageable with the face of the operating element at least in the open valve position.

4. The valve defined in claim 1 wherein the operating element is formed with an abutment having a longitudinally rearwardly directed face and the valve body is formed with a longitudinally forwardly directed face directly confronting the face of the operating element, the housing being formed with front and rear abutments engageable with the operating element and respectively defining therefore extreme forward and back positions, the operating element being displaceable between the abutments through a predetermined longitudinal stroke that is substantially longer than the axial stroke of the valve body between its closed position and a position with its forwardly directed face engaging the rearwardly directed face of the operating element.

5. The valve defined in claim 1 wherein the housing and operating element extend along a longitudinal axis and are formed with multiple interengaging screwthreads centered thereon, whereby rotation of the operating element on the housing axially and longitudinally relatively displaces the operating element and housing.

6. The valve defined in claim 5 wherein the screwthreads are so steep that the valve body is moved between its closed and open positions on about a 90° rotation of the operating element in the housing.

7. The valve defined in claim 1 wherein the stem is formed with a rearwardly open noncircular recess, whereby a tool can be fitted to the recess to rotationally immobilizes the stem during servicing of the valve.

8. A manual fluid-control valve comprising:
   a housing defining a chamber formed with a seat and with a fluid inlet and a fluid outlet opening into the chamber at opposite sides of the seat;
   a valve body in the housing having an end face and displaceable longitudinally forward into a closed position with the end face engaging the seat and blocking fluid flow through the chamber between the inlet and outlet and an open position with the end face spaced longitudinally backward from the seat and permitting fluid flow through the chamber between the inlet and outlet;

an operating element longitudinally displaceable in the housing adjacent the valve body but out of direct contact with the valve body, the operating element being formed with a longitudinally forwardly directed face and the housing being formed with a longitudinally rearwardly directed face;

a main spring braced between the operating element and the valve body and constituting the only longitudinal-force-transmitting link between the body and the operating element;

a secondary spring braced longitudinally between the operating element face and the housing face and urging the operating element longitudinally back in the housing; and mechanical actuating means connected to the operating element for longitudinally displacing same and thereby also displacing the valve body between its positions via the main spring.

9. A manual fluid-control valve comprising:

a housing defining a chamber formed with a seat and with a fluid inlet and a fluid outlet opening into the chamber at opposite sides of the seat;

a valve body in the housing having an end face and displaceable longitudinally forward into a closed position with the end face engaging the seat and blocking fluid flow through the chamber between the inlet and outlet and an open position with the end face spaced longitudinally backward from the seat and permitting fluid flow through the chamber between the inlet and outlet;

an operating element longitudinally displaceable in the housing adjacent the valve body but out of direct contact with the valve body, the operating element being movable between extreme forward and extreme back positions respectively corresponding to the closed and open positions of the valve body, the housing being formed with front and rear abutments engaging the operating element substantially only in the forward and back positions, respectively, and with inwardly open front and rear grooves adjacent the abutments, the valve body being provided with a peripheral seal engaging the housing and seated in the front and rear grooves in the forward and back positions, respectively;

a spring braced between the operating element and the valve body and constituting the only longitudinal-force-transmitting link between the body and the operating element; and mechanical actuating means connected to the operating element for longitudinally displacing same and thereby also displacing the valve body between its positions via the spring.

10. A manual fluid-control valve comprising:

a housing centered on and extending along an axis and defining a chamber formed with a seat and with a fluid inlet and a fluid outlet opening into the chamber at opposite axial sides of the seat;

a valve stem in the housing having an axial front end face and displaceable axially forward into a closed position with the end face engaging the seat and blocking fluid flow through the chamber between the inlet and outlet and an open position with the end face spaced axially backward from the seat and permitting fluid flow through the chamber between the inlet and outlet, the stem having an axially forwardly directed stem face and an axially backwardly directed stem face;

an operating sleeve surrounding the stem and axially displaceable in the housing adjacent the valve stem but out of direct contact with the valve stem, the sleeve having an axially forwardly directed sleeve face confronting the backwardly directed stem face and an axially backwardly directed sleeve face confronting the axially forwardly directed stem face;

front and rear abutments in the housing limiting the operating element to a predetermined stroke between an extreme forward position and an extreme back position that is substantially longer than the axial stroke of the valve stem between its closed position and a position with the forwardly directed stem face engaging the rearwardly directed sleeve face;

a spring inside the sleeve, surrounding the stem, and braced between the forwardly directed face of the operating sleeve and the backwardly directed stem face and constituting the only axial-force-transmitting link between the stem and the sleeve; and mechanical actuating means including interengaging screwthreads centered on the axis between the housing and the sleeve for relatively axially displacing same on relative rotation and thereby also displacing the valve stem between its positions via the spring.

11. The valve defined in claim 10 wherein the operating element is provided with means for adjusting the compression of the spring in the open position of the valve body.

12. The valve defined in claim 11 wherein the adjustment means includes a plug threaded in the operating element and forming the longitudinally forwardly directed face of the operating element.

13. The valve defined in claim 10 wherein the operating element has a forwardly directed end face engaging a rear end of the spring and the valve body has a rearwardly directed end face engaging a front end of the spring, the valve further comprising a low friction washer engaged between one end of the spring and the respective face.

* * * * *